(12) United States Patent
Sayana et al.

(10) Patent No.: US 8,537,911 B2
(45) Date of Patent: Sep. 17, 2013

(54) METHOD AND APPARATUS FOR REFERENCE SIGNAL PROCESSING IN AN ORTHOGONAL FREQUENCY DIVISION MULTIPLEXING COMMUNICATION SYSTEM

(75) Inventors: Krishna Kamal Sayana, Arlington Heights, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 271 days.

(21) Appl. No.: 13/031,390

(22) Filed: Feb. 21, 2011

(65) Prior Publication Data

US 2012/0213261 A1    Aug. 23, 2012

(51) Int. Cl.
*H04K 1/10*    (2006.01)
(52) U.S. Cl.
USPC ........... 375/260; 375/224; 375/267; 375/295; 375/299; 375/316; 375/347; 455/101; 455/132; 455/500; 455/562.1; 370/334; 370/464; 370/480; 341/173; 341/180
(58) Field of Classification Search
USPC ................. 375/260, 132, 224, 267, 295, 299, 375/316, 347; 455/452.1, 63.1, 115.1, 450, 455/67.1, 453, 424, 423, 425, 501, 101, 132, 455/500, 562.1; 370/329, 334, 464, 480; 341/173, 180
See application file for complete search history.

(56) References Cited

U.S. PATENT DOCUMENTS

| | | | |
|---|---|---|---|
| 8,305,987 B2 * | 11/2012 | Fong et al. | 370/329 |
| 2005/0163194 A1 | 7/2005 | Gore et al. | |
| 2010/0099428 A1 * | 4/2010 | Bhushan et al. | 455/452.1 |
| 2010/0238821 A1 | 9/2010 | Liu et al. | |
| 2010/0322351 A1 | 12/2010 | Tang et al. | |

FOREIGN PATENT DOCUMENTS

| | | |
|---|---|---|
| EP | 2110974 A1 | 10/2009 |
| WO | 2009098578 A2 | 8/2009 |
| WO | 2009132143 A1 | 10/2009 |
| WO | 2010064842 A2 | 6/2010 |
| WO | 2011115421 A2 | 9/2011 |

OTHER PUBLICATIONS

Motorola: "RE Muting for CSI-RS based Inter-cell Measurement and Signaling Support", 3GPP Draft; RI-184781 RE Muting for CSI-RS and Signaling Support (Final Clean), 3RD Generation Partnership Project (3GPP), Mobile Competence Centre, vol. RAN WG1, 19 August 2818 (2818-88-19), XP858458191, Sophia-Antipolis Cedex ; France[retrieved on Aug. 19, 2010], all pages.

(Continued)

*Primary Examiner* — Leon Flores

(57) ABSTRACT

A wireless communication includes a base station that configures a set of non-zero power reference signals corresponding to multiple potential transmission points to one or more users equipment UEs and configures at least one zero-power reference signal, with zero transmission power from one or more of the multiple transmission points. The base station transmits configuration information to at least one UE of the one more UEs, wherein the configuration information corresponds to a set of resource elements that are associated with a set of channel state information reference signals and wherein the set of channel state information reference signals include the set of nonzero-power reference signals and the at least one zero-power reference signal. The UE then performs a channel measurement based on one or more non-zero-power reference signals of the set of non-zero-power reference signals and performs an interference measurement based on the at least one zero-power reference signal.

21 Claims, 11 Drawing Sheets

(56) References Cited

OTHER PUBLICATIONS

Qualcomm Incorporated: "Signaling and Configuration of CSI-RS". 3GPP Draft; RI-I04797 Signaling and Configuration of CSI-RS. 3RD Generation Partnership Project (3GPP). vol. RAN WGI. Aug. 17, 2010. XP050449989. Sophia-Antipolis Cedex ; France [retrieved on Aug. 17, 2010], all pages.

Catt: "Interference Measurement over Muted RE", 3GPP Draft; RI-II0049. 3RD Generation Partnership Project (3GPP). Mobile Competence Centre. vol. RAN WGI. no. Dublin. Ireland; 20110117. Jan. 11, 2011. XP050490028. Sophia-Antipolis Cedex ; France [retrieved on Jan. 11, 2011], all pages.

Patent Cooperation Treaty, International Search Report and Written Opinion of the International Searching Authority for International Application No. PCT/US2012/024812, May 23, 2012, 16 pages.

Motorola: "CoMP Operation Based on Spatial Covariance Feedback and Performance Results of Coordinated SU/MU Beamforming", 3GPP TSG RAN1#57bis, R1-092634, Los Angeles, USA, Jun. 29-Jul. 3, 2009, all pages.

Motorola: "CoMP Operations and Evaluation", TSG-RAN WG1 #57, R1-091935, San Francisco, USA, May 4-8, 2009, all pages.

\* cited by examiner

METHOD AND APPARATUS FOR REFERENCE SIGNAL PROCESSING IN AN ORTHOGONAL FREQUENCY DIVISION MULTIPLEXING COMMUNICATION SYSTEM

FIELD OF THE INVENTION

The present disclosure relates generally to wireless communication systems, and more particularly to a processing of reference signals in an Orthogonal Frequency Division Multiplexing (OFDM) communication system.

BACKGROUND OF THE INVENTION

Coordinated Multi-Point (CoMP) transmission/reception has been proposed as a promising technology to meet the 3GPP (Third Generation Partnership Project) LTE-Advanced (LTE-A) requirements by improving performance of cell-edge UEs in particular. In CoMP operation, multiple transmission/reception points (typically geographically separated, but could also be co-located) cooperatively transmit to or receive from one or more users' equipment (UEs) to improve performance, especially the performance of cell-edge UEs. In the case of downlink CoMP, each transmission point, which can have one or more transmit antennas, is a radio unit whose signal covers a geographical area. Multiple coorperating CoMP transmission points may connect to a same base station (referred to as eNodeB or eNB in LTE) or may belong to multiple eNBs with each eNB connecting to one or more transmission points. Further, each transmission point may form its own cell or multiple transmission points may form a single logical "cell." From a user equipment (UE) perspective, a cell usually corresponds to an associated cell identifier (cell-ID), which is typically used to scramble the data and pilot signals (also referred to as reference signals) transmitted to UEs associated with that cell.

In conventional non-CoMP operation, a single transmission point, which is the serving cell of a UE, adapts the transmission parameters based on the quality of the link to the UE. In this so-called link adaption as commonly adopted in modern wireless communications, a UE needs to estimate a channel quality of a hypothetical data transmission which is traditionally from a single cell for non-CoMP operation. Channel quality is often represented as a modulation and coding scheme (MCS). UE may also feed back some recommendation of spatial transmission parameters, such as transmission rank indication, precoding matrix index, and the like. In CoMP operation, the transmission from multiple points also needs to adapt to the link condition as seen by the UE.

The UE relies on pilot signals (also known as reference signals or RS) sent from a serving cell for channel estimation (and subsequent data demodulation) and for channel quality measurements that are reported back to the eNB. Often the reference signals are scrambled with a sequence specific to a cell-ID of that particular serving cell. In order to estimate a channel and to make channel quality measurements, the eNB must have a mechanism that enables the UE to estimate the channel and also measure the interference. The usual mechanism to enable the channel estimation by the UE is for the eNB to send pilot signals from each of the transmit antennas, which essentially sound the channel. A pilot signal is a set of signals known by both the transmitter and receiver. In OFDMA systems, the pilot signals usually correspond to a time/frequency grid of resource elements (REs), where a resource element is a subcarrier in OFDM transmission. The UE would then use the pilot signals to compute channel estimates at each subcarrier location by performing interpolation and noise suppression, and measures a channel quality. Further pilot signals are also needed at the UE to reconstruct the "effective" channel for purpose of demodulation. An effective channel corresponding to one or more data streams of a UE is the precoded/beam-formed channel that a UE effectively sees applied to a data modulation signal at the receiver.

In Releases 8 and 9 of the 3GPP LTE standards, two different types of pilot signals, that is, RSs, are used for these purposes. Common or Cell-Specific reference signals (CRS) are sent from an eNB and are intended for all UEs in a cell served by the eNB. CRS could correspond to the set of physical antennas at an eNB or a set of virtualized antennas observable at all UEs. These RSs may be used for channel estimation for channel quality and spatial feedback measurements where a UE can compute a recommended antenna weights for maximizing performance at the UE. These RSs can also be used for demodulation, but an eNB has to let the UE know in some manner what antenna weights (also known as transmit precoding matrix indicator (PMI)) are used. The UE can then construct the "effective" channel based on the measured channel and the known transmit PMI information.

On the other hand, Dedicated Reference Signals (DRSs), that is, user-specific pilot signals (also referred to as UE-specific RS), are intended for a particular UE only and, in a typical operation, are only present on resources allocated to that user. Further, they usually represent the effective channel, which can be directly used for demodulation. This gives the eNB the flexibility to use user-specific precoding or beam-forming on these allocations transparently without explicitly indicating the precoding to the intended UEs.

Currently, interference measurements can be measured on these reference signals. For purpose of feedback, which is based on CRS in Release 8, interference can be measured directly on CRS after subtracting channel information from received signals. For purpose of demodulation, the interference typically is measured on DRS directly, if they are used for demodulation, or based on CRS if DRS is not present. Either way, both of these RSs, that is, CRS and DRS, are transmitted with sufficient density that allows good interference measurements.

In Release 10 of the 3GPP LTE standards, a new type of reference signal, namely a Channel State Information Reference Signal (CSI-RS), has been defined for performing channel estimation, mainly for feedback purposes. In other words, CSI-RS is not intended for use in demodulation (like CRS), but only for enabling channel state measurements at the UE for reporting feedback. This specialized requirement for CSI-RS implies that CSI-RS may be sent less frequent in time and frequency, as opposed to the larger density needed for demodulation purposes. As an example, CSI-RS may be sent with a spacing of 12 subcarriers (as opposed to three subcarriers with CRS) in the frequency domain and only as often as every five subframes (as opposed to every subframe for CRS).

However, interference measurements on CSI-RS are expected to be very inaccurate compared to CRS based measurement, due to the infrequent transmission of CSI-RS. Furthermore, in CoMP, since multiple cells or multiple transmission points (like remote radio units (RRUs)) may be jointly transmitting to a UE, one or more neighbor cells may be actively participating in interference reduction to a UE. As a result, interference measurements that are conventionally defined to be 'any interference other than the serving cell' are not always valid. That is, the set of cells that should be counted as interferers could depend on the set of participating CoMP transmission points. Interference measurements directly on CSI-RS may not always reflect the actual interference. Therefore, there is a need for additional definitions of configurations for interference measurements that address multi-cell CoMP operations.

In other words, a need exists for enabling both channel estimation and interference measurement at a UE in a 3GPP LTE-A communication system and that accounts for the CoMP interference correctly.

Figure 1:
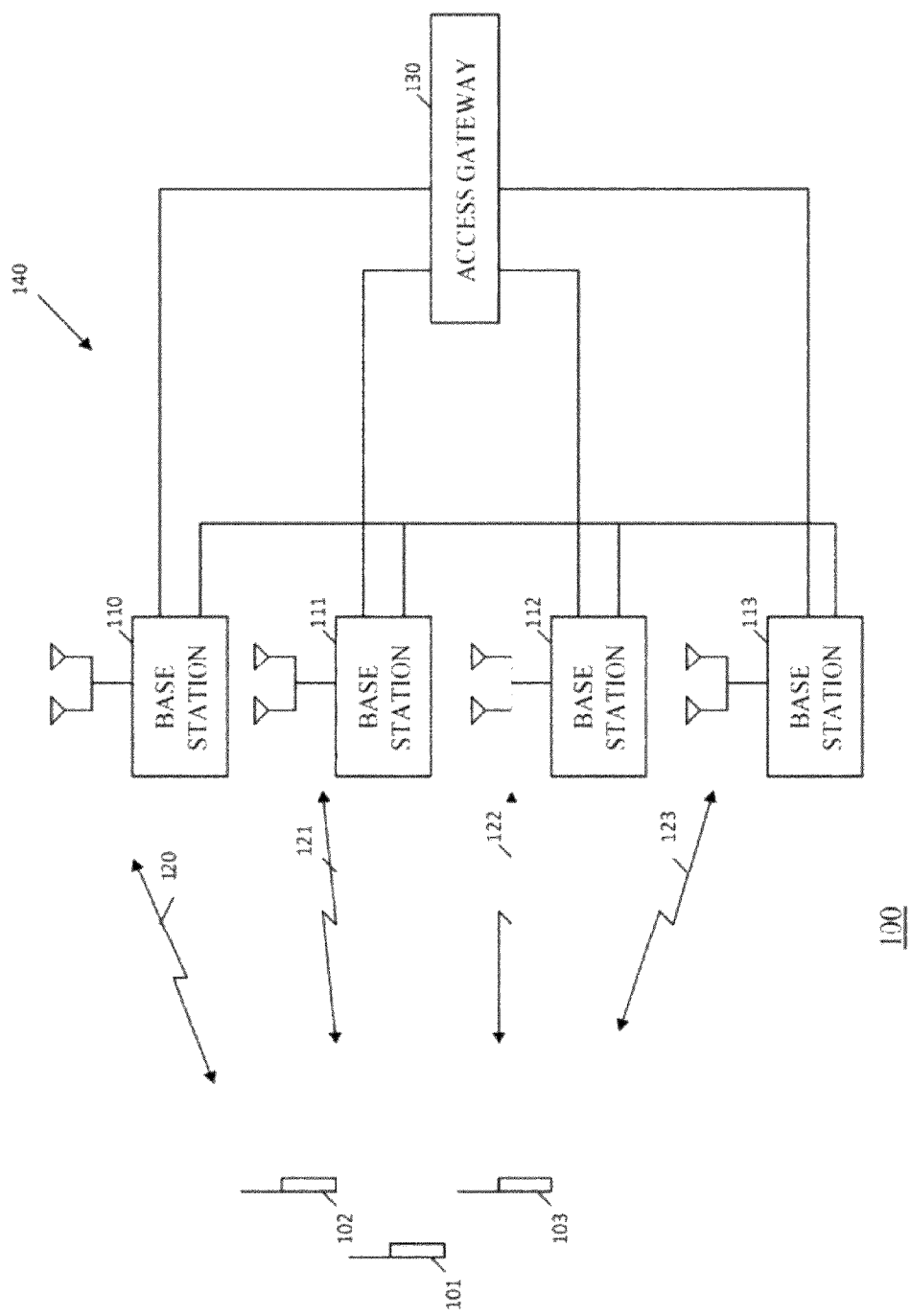
FIG. 1 is a block diagram of a wireless communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

In order to address the need for enabling both channel estimation and interference measurement at a UE in a 3GPP LTE-A communication system and that accounts for the CoMP interference correctly, a wireless communication is provided that includes a base station that configures a set of non-zero power reference signals corresponding to multiple potential transmission points to one or more users equipment (UEs) and configures at least one zero-power reference signal, with zero transmission power from all of the multiple transmission points. The base station transmits configuration information to at least one user equipment (UE) of the one or more UEs, wherein the configuration information corresponds to a set of resource elements that are associated with a set of channel state information reference signals and wherein the set of channel state information reference signals include the set of nonzero-power reference signals and the at least one zero-power reference signal. The wireless communication system further includes a UE that receives the configuration information, performs a channel measurement based on one or more non-zero-power reference signals of the set of non-zero-power reference signals and performs an interference measurement based on the at least one zero-power reference signal.

Generally, an embodiment of the present invention encompasses a method for reference signal processing in a wireless communication user equipment. The method includes receiving a downlink transmission of configuration information, wherein the configuration information comprises a set of non-zero-power reference signals corresponding to multiple potential transmission points and at least one zero-power reference signal with zero transmission power, performing a channel measurement based on one or more non-zero-power reference signals of the set of non-zero-power reference signals, and performing an interference measurement based on the at least one zero-power reference signal.

Another embodiment of the present invention encompasses a method for reference signal processing in a wireless communication system. The method includes transmitting configuration information to a user equipment of a set of non-zero power reference signals corresponding to a multiple potential transmission points and transmitting configuration information to the user equipment of at least one zero-power reference signal, with zero transmission power from all of the multiple potential transmission points.

Yet another embodiment of the present invention comprises a user equipment capable of processing a reference signal in a wireless communication system. The user equipment includes a receiver that receives a downlink transmission of configuration information, wherein the configuration information identifies a set of nonzero-power reference signals corresponding to multiple potential transmission points and at least one zero-power reference signal with zero transmission power. The user equipment further includes a processor that is adapted to perform a channel measurement based on one or more non-zero-power reference signals of the set of non-zero-power reference signals and perform an interference measurement based on the at least one zero-power reference signal.

Still another embodiment of the present invention comprises a base station capable of reference signal processing in a wireless communication system. The base station includes a processor that is adapted to configure a set of non-zero power reference signals corresponding to multiple potential transmission points and configure at least one zero-power reference signal, with zero transmission power from all of the multiple potential transmission points.

The present invention may be more fully described with reference to FIGS. 1-11. FIG. 1 is a block diagram of a wireless communication system 100 in accordance with an embodiment of the present invention. Communication system 100 includes multiple user equipment (UE) 101-103 (three shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes an access network 140 comprising multiple base stations (BSs) 110-113 (four shown), such as a Node B, an eNodeB, an Access Point (AP), or a Base Transceiver Station (BTS) (the terms BS, eNodeB, eNB, and NodeB are used interchangeably herein), that includes an antenna array comprising multiple antennas and that supports Multiple-Input Multiple-Output (MIMO) communications and that each provides communication services, via a corresponding air interface 120-123, to users' equipment, such as UE 101-103, residing in a coverage area, such as a cell or a sector of a cell, served by the base station (BS). Each BS 110-113 can also each be referred to as a transmission point (TP) with a certain number of antennas.

Each air interface 120-123 comprises a respective downlink and a respective uplink. Each of the downlinks and uplinks comprises multiple physical communication channels, including multiple control/signaling channels and multiple traffic channels. Each BS of the multiple BSs 110-113 is in communication with the other BSs of the multiple BSs via one or more of a network access gateway 130 and an inter-BS interface that may comprise one or more of a wireline link and a wireless link of all of the BSs and via which each BS may broadcast to the other BSs. Access network 140 further includes an access network gateway 130. Access network gateway 130 provides access for each of BSs 110-113 to other parts of an infrastructure of communication system 100 and to each other, and may be, for example but not limited to, any one or more of a Radio Network Controller (RNC), a mobile switching center (MSC), a Packet Data Service Node (PDSN), or a media gateway.

Figure 2:
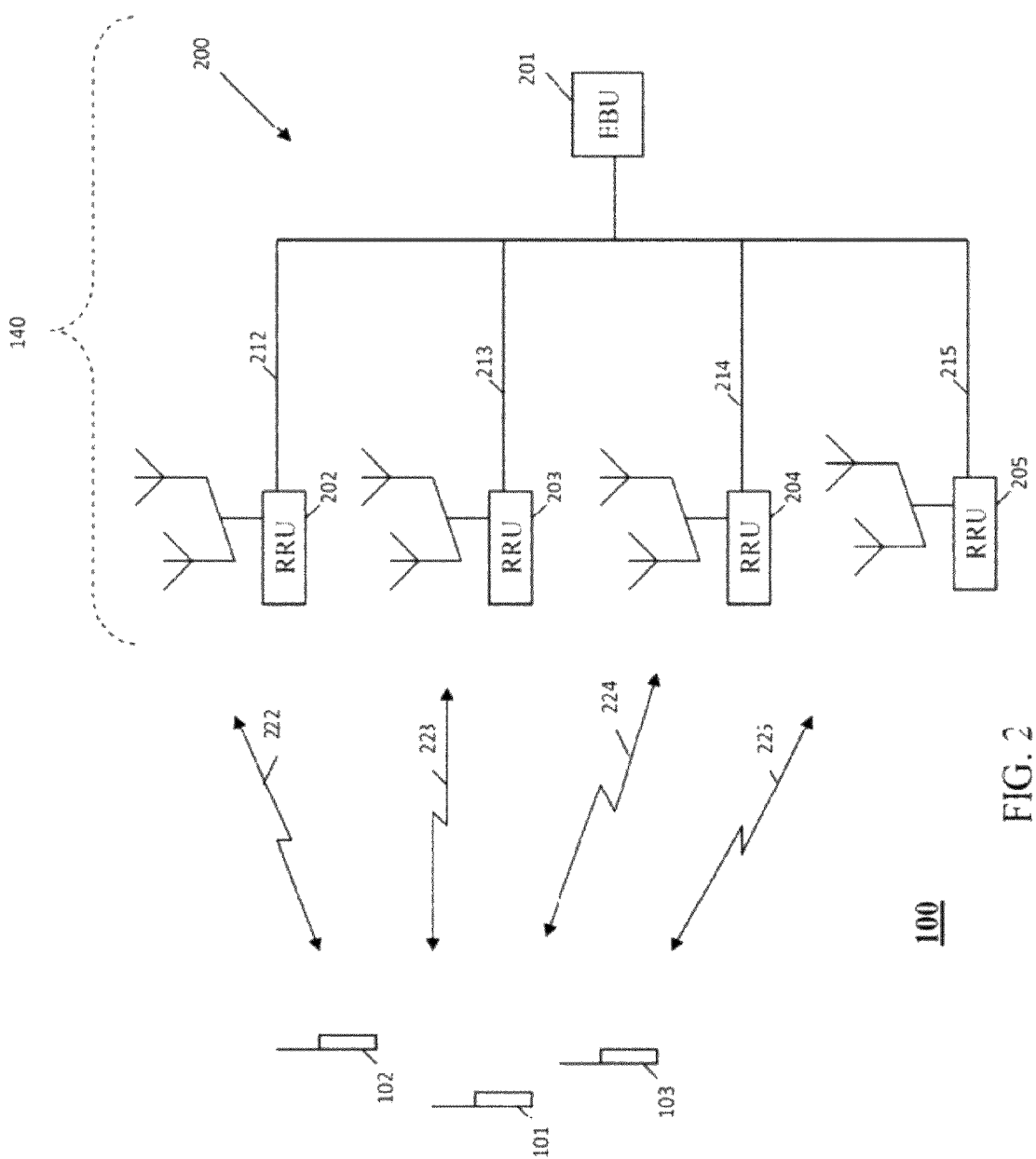
FIG. 2 is a block diagram of a wireless communication system in accordance with another embodiment of the present invention.

Referring now to FIG. 2, a block diagram is provided of wireless communication system 100 in accordance with another embodiment of the present invention. In communication system 100 as depicted in FIG. 2, access network 140 includes a BS 200 whose functionality is distributed among a Base Band Unit (BBU) 201 and multiple Remote Radio Units (RRUs) 202-205 (four shown) coupled to the BBU. Each RRU 202-205 comprises an antenna array that includes one or more antennas and further includes other functionality, and is responsible for receiving and transmitting the radio frequency signals from and to a UE, such as UE 101, residing in a coverage area of the RRU via a corresponding air interface 222-225. Each RRU 202-205 can also each be referred to as a transmission point (TP) with a certain number of antennas. Each air interface 222-225 comprises a respective downlink and a respective uplink. Each of the downlinks and uplinks comprises multiple physical communication channels, including multiple control/signaling channels and multiple traffic channels. BBU 201 is coupled to each of the multiple RRUs 202-205 by a corresponding backhaul link 212-215, for example, a wireless link or a wired link such as a fiber optic network. In still other embodiments of the present invention, communication system 100 may comprise system that is a combination of the embodiments depicted in FIGS. 1 and 2.

Figures 3, 4:
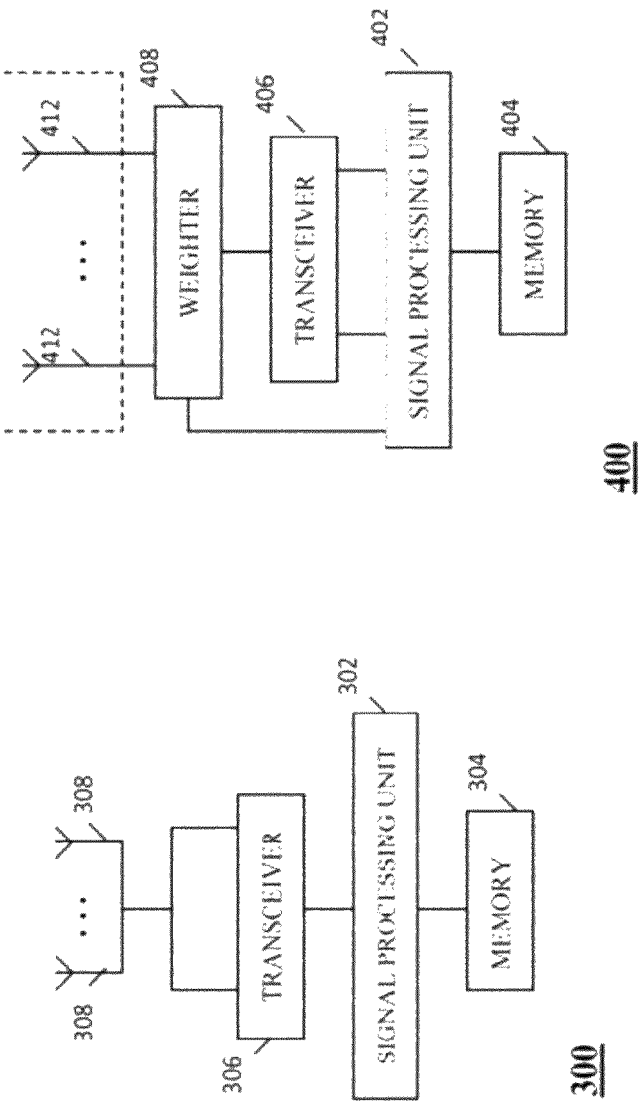
FIG. 3 is a block diagram of a user equipment of the communication system of FIG. 1 in accordance with an embodiment of the present invention.
FIG. 4 is a block diagram of a base station of the communication system of FIG. 1 in accordance with an embodiment of the present invention.

Referring now to FIGS. 3 and 4, block diagrams are provided of a UE 300, such as UEs 101-103, and a BS 400, such as BSs 110-113 and 200, in accordance with various embodiments of the present invention. Each of UE 300 and BS 400 includes a respective signal processing unit 302, 402, such as one or more microsignal processing units, microcontrollers, digital signal signal processing units (DSPs), combinations thereof or such other devices known to those having ordinary skill in the art. The particular operations/functions of signal processing units 302 and 402, and respectively thus of UE 300 and BS 400, are determined by an execution of software instructions and routines that are stored in a respective at least one memory device 304, 404 associated with the signal processing unit, such as random access memory (RAM), dynamic random access memory (DRAM), and/or read only memory (ROM) or equivalents thereof, that store data and programs that may be executed by the corresponding signal processing unit.

Each of UE 300 and BS 400 further includes a respective one or more transceivers 306, 406 coupled to the signal processing unit 302, 402 of the UE or BS. For example, BS 400 may include multiple transceivers, that is, a transceiver at each RRU 202-205. Each transceiver 306, 406 includes receiving circuitry (not shown) and transmitting circuitry (not shown) for receiving and transmitting signals over an air interface, such as air interfaces 120-123 and 222-225. UE 300 includes one or more antennas 308 and, in the event the UE comprises multiple antennas, may support MIMO communications. BS 400 further includes one or more arrays 410 of antennas, for example, BS 400 may include multiple antenna arrays, that is, array at each RRU 202-205, which arrays each are in communication with a corresponding transceiver 306 and which arrays each comprises multiple antennas 412. . By utilizing an antenna array to transmit signals to a UE located in a coverage area of the BS, such as a cell or sector serviced by the antenna array, the BS is able to utilize MIMO techniques for the transmission of the signals.

In a conventional sense, the term 'antenna port' typically has been used to refer to a 'physical' antenna port at an eNB. A reference signal is usually associated with (i.e., transmitted from) an antenna port, which allows a UE to make measurements on that antenna port, and thereby estimate a channel from the corresponding antenna port to the UE receivers. In the 3GPP specification, the definition of 'antenna ports' has an expanded scope to deal with some new concepts. An antenna port could correspond to any well-defined description of a transmission from one or more of antennas. As an example, it could include a beamformed transmission from a set of antennas with antenna weights being applied, where the set of antennas itself could be unknown to the UE. In this case, the effective channel can be learned from DRS (dedicated reference signal) sent from an associated antenna port. Further, as used herein, an antenna port may also be associated with a zero-power reference signal, which could be defined as zero transmission power from one or more antennas. Such a description could also be useful, specifically for interference measurements. Typically, a reference signal is associated with an antenna port for the purpose of measurement at the UE. The use of the term "RS port" (e.g., CSI-RS port) herein is for the convenience of the reader of the description below and it should be understood to mean a reference signal associated with an antenna port.

BS 400 further includes a weighter 408 in association with each transceiver of the one or more transceivers 406, such as a precoder or any other type of signal weighter, that is in communication with signal processing unit 402 and that is interposed between a corresponding antenna array 410 and a corresponding transceiver 406. In another embodiment of the present invention, weighter 408 may be implemented by signal processing unit 402. Weighter 408 weights signals applied to the multiple antennas 412 of a corresponding antenna array 410 based on channel state information (CSI) fed back by a UE, for example, codebook feedback such as a codebook index and a rank index, statistical feedback such as a covariance matrix or any other type of matrix, eignevectors, or channel quality mean and variance, a received signal quality information, a channel frequency response, or any other type of channel feedback known in the art, in order to predistort and beamform the signals for transmission to the UE over the downlink of the intervening air interface.

When weighter 408 comprises a precoder, each of UE 300 and BS 400 may further maintain, in at least one memory devices 304 and 404 and/or in precoder 408, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Indicator (PMI), for a group of resource elements (REs) where an RE is a time-frequency resource such as a 12 subcarriers in frequency by 7 OFDM symbols in time. In determining a precoding metric for a group of REs, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel.

The embodiments of the present invention preferably are implemented within UE 101-103 and BSs 110-113 and 200, and more particularly with or in software programs and instructions stored in the at least one memory devices 304, 404 and executed by signal processing units 302, 402 of the UEs and BSs. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-103 and BSs 110-113 and 200. Based on the present disclosure, one skilled in the art will be readily capable of producing and implementing such software and/or hardware without undo experimentation.

Communication system 100 comprises an Orthogonal Frequency Division Multiple Access (OFDMA) modulation scheme for transmitting data over air interface 206, wherein a frequency channel, or bandwidth, is split into multiple physical resource blocks (PRBs) during a given time period. Each physical resource block (PRB) comprises multiple orthogonal frequency sub-carriers over a given number of OFDM symbols, that are the physical layer channels over which traffic and signaling channels are transmitted in a TDM or TDM/FDM fashion. A communication session may be assigned a PRB or a group of PRBs for an exchange of bearer information, thereby permitting multiple users to transmit simultaneously on the different PRBs such that each user's transmission is orthogonal to the other users' transmissions. A PRB also may be assigned to multiple users in which case the users are no longer orthogonal but they can be separated based on spatial signatures of the individual transmit weights.

In addition, communication system 100 preferably operates according to the Third Generation Partnership Project (3GPP) Long Term Evolution-Advanced (LTE-A) standards, which standards specify wireless telecommunications system operating protocols including radio system parameters and call processing procedures, and implements coordinated multipoint transmission (CoMP). However, those who are of ordinary skill in the art realize that communication system 100 may operate in accordance with any wireless telecommunication standard employing an Orthogonal Frequency Division Multiplexing (OFDM) modulation scheme, such as but not limited to other 3GPP communication systems employing channel estimation and feedback of channel interference measurements, a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (WiMAX) communication system that operates in accordance with the IEEE (Institute of Electrical and Electronics Engineers) 802.16 standards, including 802.16e and 802.16m.

Among the signals being multiplexed and transmitted to a UE 101-103 from each of multiple coverage areas, such as by the multiple BSs 110-113 and/or by the multiple RRUs 202-205 associated with BS 200, are reference or pilot signals which may be multiplexed with other control information and user data. Pilot signals, and more particularly Channel State Information-Reference Signals (CSI-RSs), are sent from antennas of a serving BS or RRU that may transmit to a UE in order for the UE to determine channel state information (CSI) that is fed back to a serving BS. Additionally, with respect to CoMP transmissions, the UE may need to determine CSI for multiple transmission points or multiple BSs as well.

Figure 5:
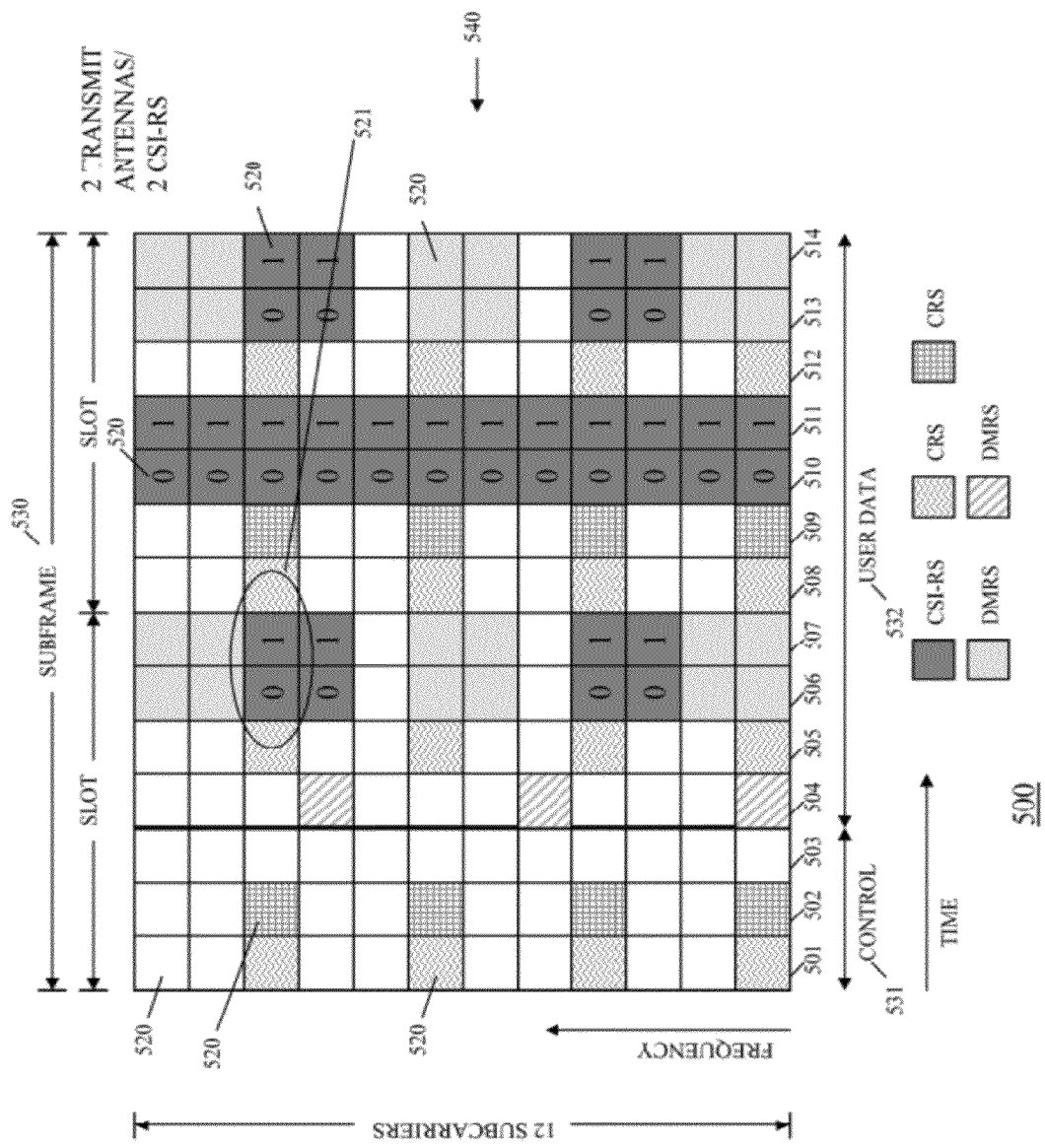
FIG. 5 is an exemplary time-frequency diagram of an OFDMA physical resource block (PRB) employed by the communication system of FIG. 1 and that illustrates pilot signal placement within the OFDMA PRB in accordance with an embodiment of the present invention.
Figure 6:
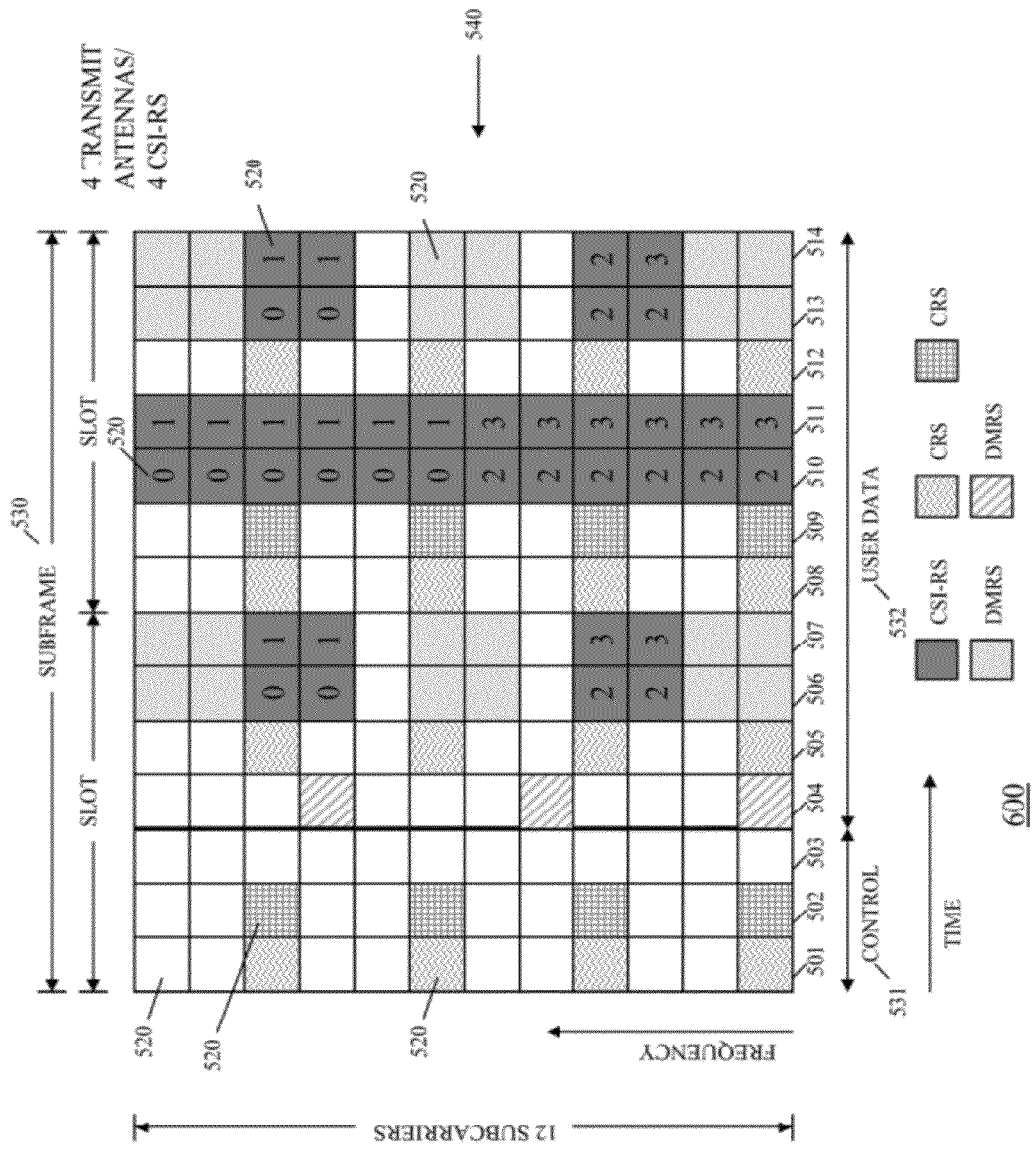
FIG. 6 is an exemplary time-frequency diagram of an OFDMA physical resource block (PRB) employed by the communication system of FIG. 1 and that illustrates pilot signal placement within the OFDMA PRB in accordance with another embodiment of the present invention.
Figure 7:
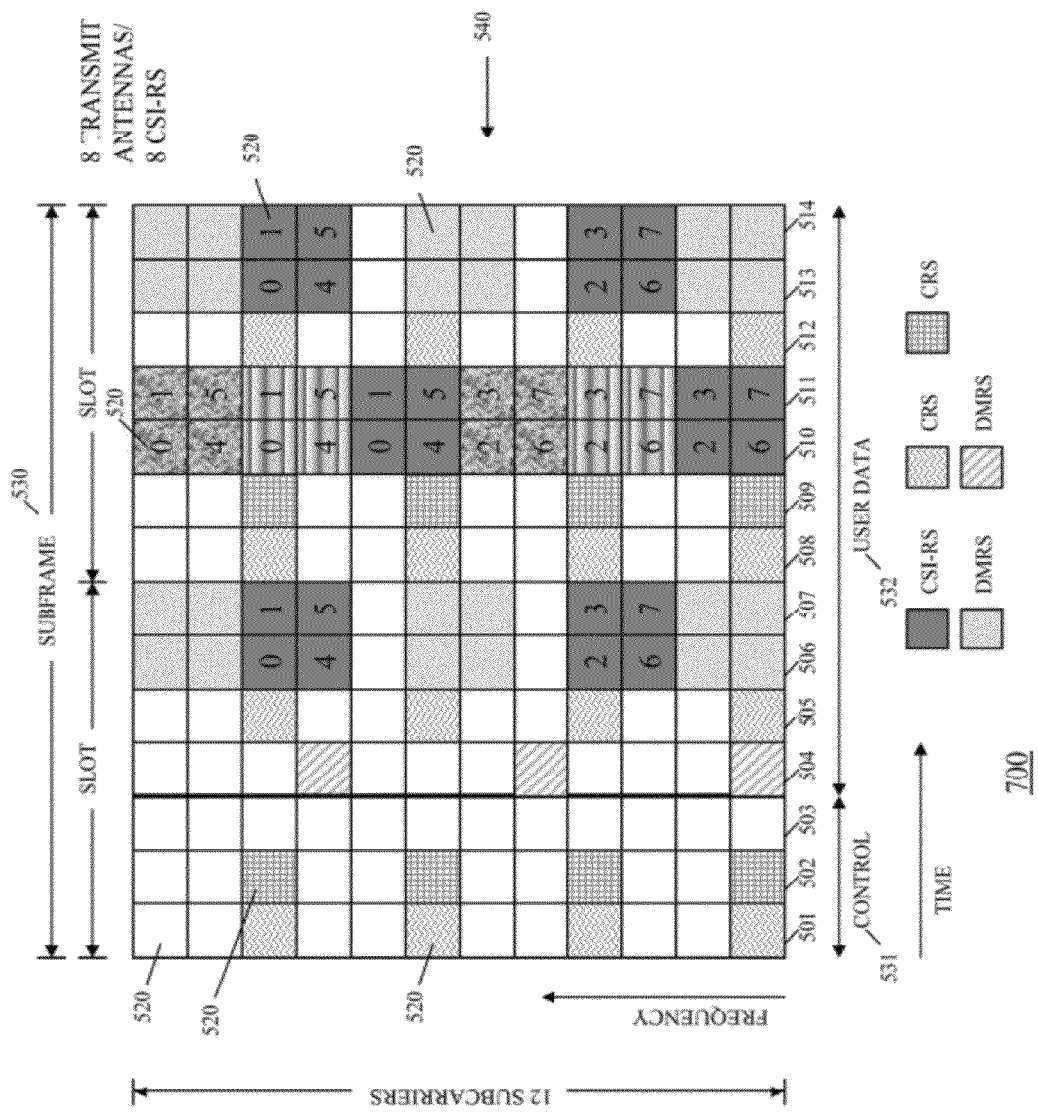
FIG. 7 is an exemplary time-frequency diagram of an OFDMA PRB employed by the communication system of FIG. 1 and that illustrates pilot signal placement within the OFDMA PRB in accordance with another embodiment of the present invention.

Referring now to FIGS. 5, 6, and 7, time-frequency diagrams 500, 600, 700 respectively are provided that depict exemplary distributions of pilot signals, and particularly CSI-Reference Signals (CSI-RSs), in a OFDMA PRB 540 and over a subframe 530 that may be employed by communication system 100 in accordance with various embodiments of the present invention. The terms 'pilot signals' and 'reference signals' are used interchangeably herein. A vertical scale of each time-frequency diagram 500, 600, 700 depicts multiple blocks of frequency, or frequency bins, (frequency subcarriers) of the subframe that may be allocated. A horizontal scale of each time-frequency diagram 500, 600, 700 depicts multiple blocks of time (in units of OFDM symbols) 501-514 of the subframe that may be allocated. Subframe 530, depicted in time-frequency diagrams 500, 600, and 700, comprises a physical resource block (PRB) 540, wherein the PRB comprises 12 OFDM subcarriers over two time slots comprising 14 OFDM symbols. In turn, PRB 540 is divided into multiple resource elements (REs) 520, wherein each RE is a single OFDM subcarrier, or frequency bin, on a single OFDM symbol. Further, PRB 540 comprises a control region 531, for the transmission of control data, and a user data region 532, for the transmission of user data.

PRB 540 includes multiple Channel State Information (CSI) reference signal configurations, which configurations define which resource elements (REs) of the PRB are allocated to the CSI Reference Signals (CSI-RSs). A CSI reference signal configuration is used to refer to a set of resources (REs in an OFDM system) that may be used to transmit a set of CSI-RSs corresponding to a group of one or more transmit antennas. It should be understood that such reference signals corresponding to the group of antennas may be mapped into the set of available REs using any multiplexing method known in the art, for example, either code division multiplexing (CDM) or frequency/time division multiplexing where each individual antenna reference signal occupies a different RE. An exemplary operation is described based on the Release 10 specification of LTE.

In the current Release 10 version of the 3GPP LTE specification, for a given number (or group) of transmit antenna ports, multiple CSI reference signal configurations are defined. For example, and referring now to FIG. 5, exemplary CSI reference signal configurations are depicted with groupings of two transmit antenna ports. Each pair of ports [0, 1], are multiplexed with time domain CDM. Such a pair [0, 1] corresponds to two antenna ports (say 0 and 1) that share the two corresponding reference elements (REs) 521 with a simple CDM code of [1, 1] and [1,-1]. As seen in FIG. 5, any of the potentially 20 CSI reference signal configurations (each indicated by a pair of resource elements labeled (0,1), for example, pair 521) can be configured for measurements on two antenna ports at a UE.

PRB 540 also includes non-CSI-RS pilot signals that are distributed in control region 531 and/or user data region 532 of the PRB. For example, the shaded REs of PRB 540 are reserved for, that is, allocated to, other reference symbols, either a common reference signal (CRS) or a dedicated reference signal (DRS). These other reference signals may be present but are not necessarily used for channel estimation or interference measurements by a UE in an LTE-A communication system.

The CSI reference signal configurations depicted in FIGS. 5, 6, and 7 are naturally valid for BSs with 2, 4, or 8 transmit antennas respectively. For example, FIG. 6 depicts exemplary CSI reference signal configurations with groupings of four transmit antenna ports. That is, in FIG. 6, two CDM pairs of REs (0,1) and (2,3) (not necessarily adjacent to each other) are mapped by a single CSI reference signal configuration (a redefined set of configurations are used for four transmit antenna ports) and corresponds to four antenna ports. By way of another example, FIG. 7 depicts an exemplary CSI reference signal configuration with groupings of eight transmit antenna ports. That is, in FIG. 7, four CDM pairs of REs (0,1),(2,3),(4,5), and (6,7) (not necessarily adjacent to each other) are mapped by a single CSI reference signal configuration corresponding to eight antenna ports.

As depicted in FIGS. 5, 6, and 7, in setting up CSI-RS reference signals for a UE corresponding to two, four and eight antenna ports, one of 20, 10, and 5 available configurations, respectively, can be used. If a CSI reference signal configuration is not needed for a corresponding antenna port, user data may be allocated in place of the unused configurations. The information of CSI reference signal configurations (for a particular BS or a particular transmission point or multiple BS or multiple transmission points) may be conveyed by signaling. The number of BSs that a UE may be able to use for detection and measurement of channel state information (CSI) and their relationship to the CSI reference signal configurations may also be controlled by a BS.

As depicted in FIGS. 5, 6, and 7, CSI-RS corresponding to an antenna port is allocated to a resource element (RE) pair in user data region 532, and more particularly to one of the RE pairs associated with OFDM symbols 506-507, 510-511, and 513-514. As also depicted in FIGS. 5, 6, and 7, one antenna may transmit CSI-RS over any of the possible 20 RE pairs corresponding to 20 CSI reference signal configurations. Typically in a single cell transmission, only up to four CSI-RS RE pairs, and thus total of 8 REs, are needed to support up to a maximum of eight transmit antennas and the remainder of the REs corresponding to other CSI reference symbol configurations may be used for other purposes. For example, as needed such other CSI reference symbol configurations can be used to support additional reuse so that reference signals from different cells may not overlap. They may also be used for other purposes in future releases of the specification.

In a CoMP operation, as briefly described before, one or more transmission points that are connected to one or more eNBs may cooperatively transmit to a UE. Such cooperation may be performed broadly, but is not limited to two approaches. One approach is a joint transmission, where a set of transmission points jointly transmit data symbols intended for a UE. Another approach is coordinated beamforming, where neighbor transmission points which transmit to a second UE and thus can potentially interfere with a first UE and may transmit in such a way to suppress interference spatially to the first UE. In a typical operation, transmission points that coordinate for a joint transmission may be most likely the transmission points or RRUs associated with a central base station controller or an eNB. On the other hand coordinated beamforming could be from transmission points corresponding to different eNBs. Exceptions to this are possible based on network deployment and traffic needs. In general, however, from a UE perspective, the UE may be receiving signals corresponding to i) desired data symbols jointly transmitted from one set of transmission points, ii) suppressed interference received from other transmission points that may be coordinating to suppress interference, and iii) the residual interference seen by a UE, which originated from non-coordinating transmission points (which may be typically outside the control area of an eNB or coordination area of cooperating eNBs). Depending on the exact transmission mode applied, the channel based on set i), the interference based on ii), and the interference based on iii) may have to be measured by the UE to derive channel quality feedback. This is now addressed in greater detail.

In one embodiment of the present invention, in order to enable UE 101 to perform both channel estimation and interference measurement, communication system 100 transmits configuration information of a set of non-zero-power reference signals corresponding to (antenna ports of) multiple potential transmission points, and configuration information of at least one zero-power reference signal with zero transmission power from one or more of the multiple potential transmission points. Further, the configuration information also corresponds to a set of resource elements that are associated with a set of channel state information reference signals wherein the set of channel state information reference signals include the set of non-zero-power reference signals and the at least one zero-power reference signal.

A UE, such as UE 101, then may perform channel measurements based on a first subset of the set of non-zero-power reference signals, that is, measure the received CSI-RS and estimate a channel response for a channel between the UE and a given access network antenna based on the measurement. The first subset of the set of non-zero-power reference signals are sent from a set of actual transmission points chosen from the set of multiple potential transmission points, wherein the set of actual transmission points consists of all or a subset of the multiple potential transmission points, and may be determined as the preferred transmission points for a UE. The UE also may perform interference measurements based on the at least one zero-power reference signal, that is, may measure interference originating from outside all of the potential CoMP transmission points.

The UE may measure a channel quality, such as a level of interference produced by signals transmitted by other transmissions in the network that represent interference, and determine, based on these channel and interference measurements, a channel quality metric, such as a CQI or some kind of interference metric, such as a noise power, a Signal to Noise Ratio (SNR), a Carrier power to Interference plus Noise Ratio (CINR), or Signal to Interference plus Noise power Ratio (SINR).

Figure 8:
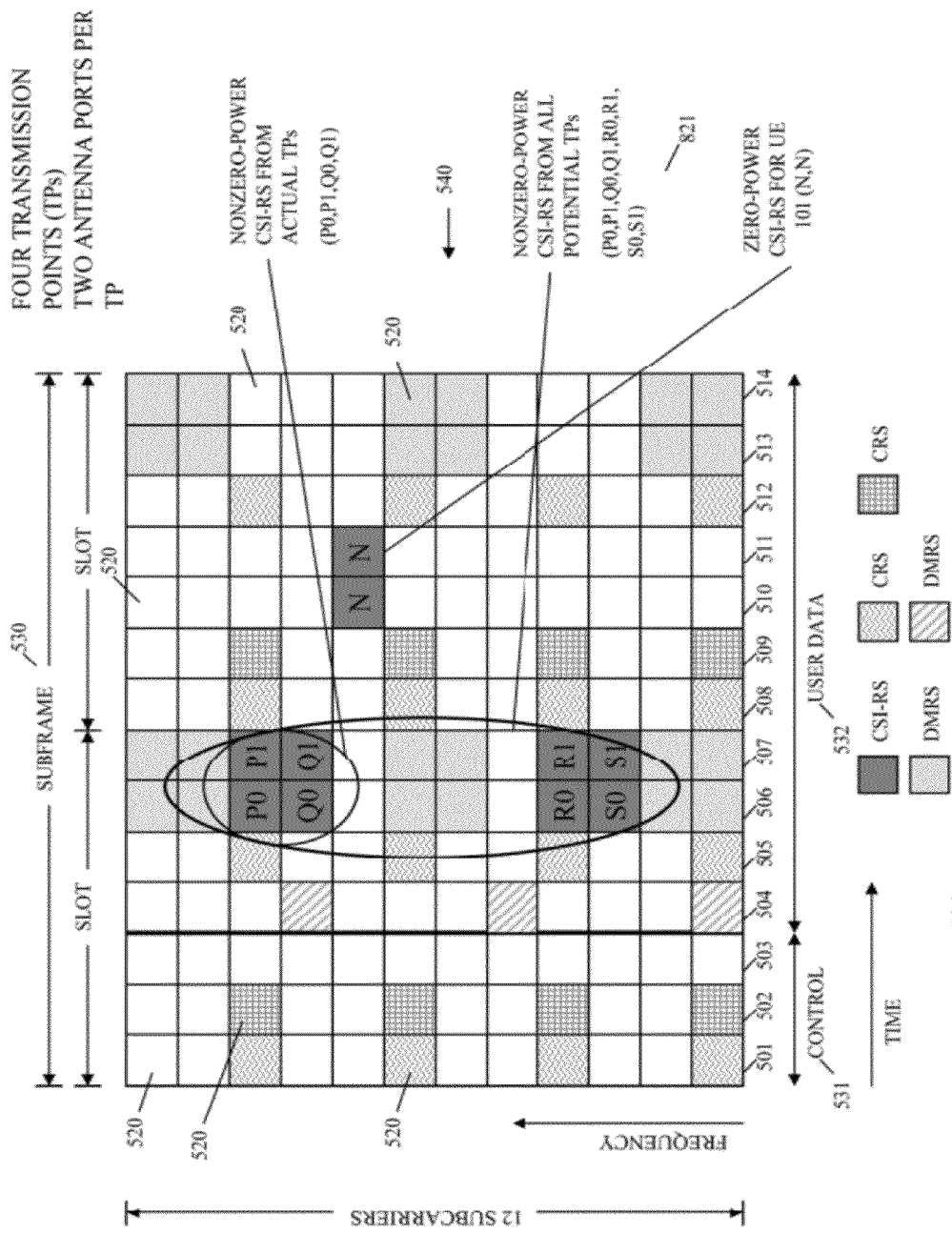
FIG. 8 is a block diagram illustrating an exemplary Channel State Information Reference Signal (CSI-RS) allocation scheme in accordance with an embodiment of the present invention.

Referring now to FIG. 8, an exemplary embodiment of the present invention is illustrated that may be described as a "non-transparent" operation. By non-transparent operation, that refers to a case where a UE may be aware of actual transmission points, and may be instructed to perform interference measurements in a non-transparent fashion. To further elaborate with an example, suppose a UE is configured with information of a set of four potential transmission points (not depicted but for ease of reference referred to as transmission points 1-4 or P,Q,R,S in FIG. 8), each with two transmit antennas (corresponding antenna ports are referred to as (P0, P1),(Q0,Q1),(R0,R1),(S0,S1)). Eight CSI-RSs corresponding to these eight antenna ports (for reference purposes, also number them 1-8) are sent on four pairs of resource elements (REs) (labeled in FIG. 8 corresponding to antenna port pairs (P0,P1), (Q0,Q1), (R0,R1), and (S0,S1)). The four transmission points represent potential transmission points for a UE, among which all or a subset of transmission points would coordinate the transmission to that UE, which would then be the actual transmission points to the UE. An additional two CSI-RS reference signals, represented as 'N' (the pair (N, N) in FIG. 8, the same zero-power port mapped to two reference signals), which is mapped to a pair of REs, has zero power from all the four potential transmission points. In practice, a single RE is sufficient for transmitting a zero-power reference signal. However, a pair of REs may be used, since current CSI-RS configurations are defined based on a minimum unit of two REs. This does not preclude further using only one of them for setting up a zero-power reference signal and using the other for other purpose or additional zero-power signals.

Further, assume two transmission points, for example, transmission points 1 and 2, are actually coordinated in the transmission to the UE, which are a subset of the four potential transmission ports, corresponding to a first subset of nonzero-power reference signals. However, in this case, a UE is explicitly aware of all the antenna ports and is expected to measure also on the rest of the nonzero-power reference signals from other transmission ports, if instructed to do so. The 'zero power' in this case corresponds to zero transmission from all of the eight antenna ports (1-8) corresponding to the four potential transmission points 1-4. With the assumed actual transmission points being the first two transmission points 1, 2 (and, for the purpose of this illustration, corresponding antenna ports being 1-4), a UE performs channel measurements based on antenna ports 1-4. Further interference measurements are based on i) antenna ports 5-8 corresponding to transmission points 3 and 4, which are not actual transmission points to the UE, but known and measurable from reference signals and ii) also the residual interference measured on the zero-power reference signal 'N,' which represents any interference originating outside the four (coordinating) transmission points 1-4. In other words, the UE measures on a second subset of non-zero-power reference signals (corresponding to antenna ports 5-8), wherein the second subset of nonzero-power reference signals consists of all reference signals in the set of non-zero-power reference signal (corresponding to antenna ports 1-8) that do not belong to the first subset of non-zero-power reference signals (corresponding to antenna ports 1-4). UE will need to include the measurement on the second subset of nonzero-power reference signals in the total interference measurement as further described below.

Channel quality measurements are then based on these channel and interference measurements. As an example, consider the signal to interference-plus-noise ratio (SINR) as the channel quality metric. Let $H_i$ represent the channel from a transmit antenna port 'i' to $N_r$ receive antennas at the measuring UE ($H_i$ is a matrix of size $N_r$ x1). Then one way to represent the SINR measured would be $$\frac{\sum_{i=1}^{4} \|H_i\|^2}{\sum_{i=5}^{8} \|H_i\|^2 + I_o}$$

where the numerator captures the total "useful" power on antenna ports 1-4 (expressed here as a L2-norm of the channel matrix), and the denominator corresponds to the known potential transmission ports that do not coordinate and thus constitute as interference, and $I_o$, which is the interference measured on the 'zero-power' reference signal.

However, there is some difference in how the UE measures these two components of interference. The interference on known antenna ports 5-8 that interfere can be obtained by explicit channel measurements on the corresponding antenna ports (with the knowledge of corresponding pilot signal sequence), and an estimated total channel power on each such antenna port can be used to derive the contribution of that antenna port to the total interference as presented in the equation above. On the other hand, it is relatively simpler to obtain the residual interference $I_o$ on the zero-power reference signals. An estimate of $I_o$ can simply be obtained as follows:

$$I_o = \frac{1}{L}\sum_{n=1}^{L} |Y_n|^2$$

where $Y_n$ represents observed signal on a particular RE/subcarrier n, and L could be the total number of observations available for measurement. It must also be noted however the residual interference may be also present on all the REs in an RB, even those assigned to reference signals for the other four transmission points. In such a case, a UE's receiver may use the knowledge of the interference power $I_o$ measured on the zero-power port to aid the channel estimation of other antenna ports. It is well known that optimal channel estimation weights are dependent on the noise variance on the pilot signals, and better knowledge of such variance would improve channel estimation.

Other concepts concerning the channel quality information can be defined. More relevant channel quality information takes into account the per-subcarrier SINRs achieved with a precoding matrix and typically use well known link abstraction mappings based on EESM (Exponential Effective SINR mapping)/MIESM (Mutual Information Effective SINR mapping) or any other similar metrics known in the art. The following is one example. The SINR on a subcarrier 'n' can be expressed as (if precoding "F" is assume to be applied)

$$\frac{H_n F}{\sum_{i=5}^{8} \|H_{i,n}\|^2 + I_{o,n}}$$

In the above equation $H_n=[H_1\ H_2\ H_3\ H_4]$ is the joint concatenated channel received from the first four actual transmit antennas and is of size '$N_r \times 4$,' and F is the precoder matrix of size '4×r' ('r' is the number of columns in F corresponding to the associated rank of transmission, that is, the number of spatial layers of transmission). Such per-subcarrier SINR measurement can be translated to a CQI value which is essentially a modulation and coding level that can be supported by the UE, with actual transmission from antenna ports 1-4 by applying precoder F, interference observed from antenna ports 5-8, and residual interference as seen from the zero-power reference signal. The precoder matrix F and rank r can be determined by the UE to maximize the channel quality and feedback along with the corresponding channel quality index based on the channel measurements on the first subset of nonzero-power reference signals and the interference measurement.

Further it should also be noted that interference corresponding to antenna ports 5-8 may be measured based on the precoder that could be applied on these antenna ports more generally, as opposed to total un-precoded channel power as described. For example, one can consider any spatial weights that may be applied on these antenna ports as part of transmission to other UEs, if such information is known to the UE performing channel quality measurements. However, this is not always necessary, and examples described here should suffice in many cases.

Figure 9:
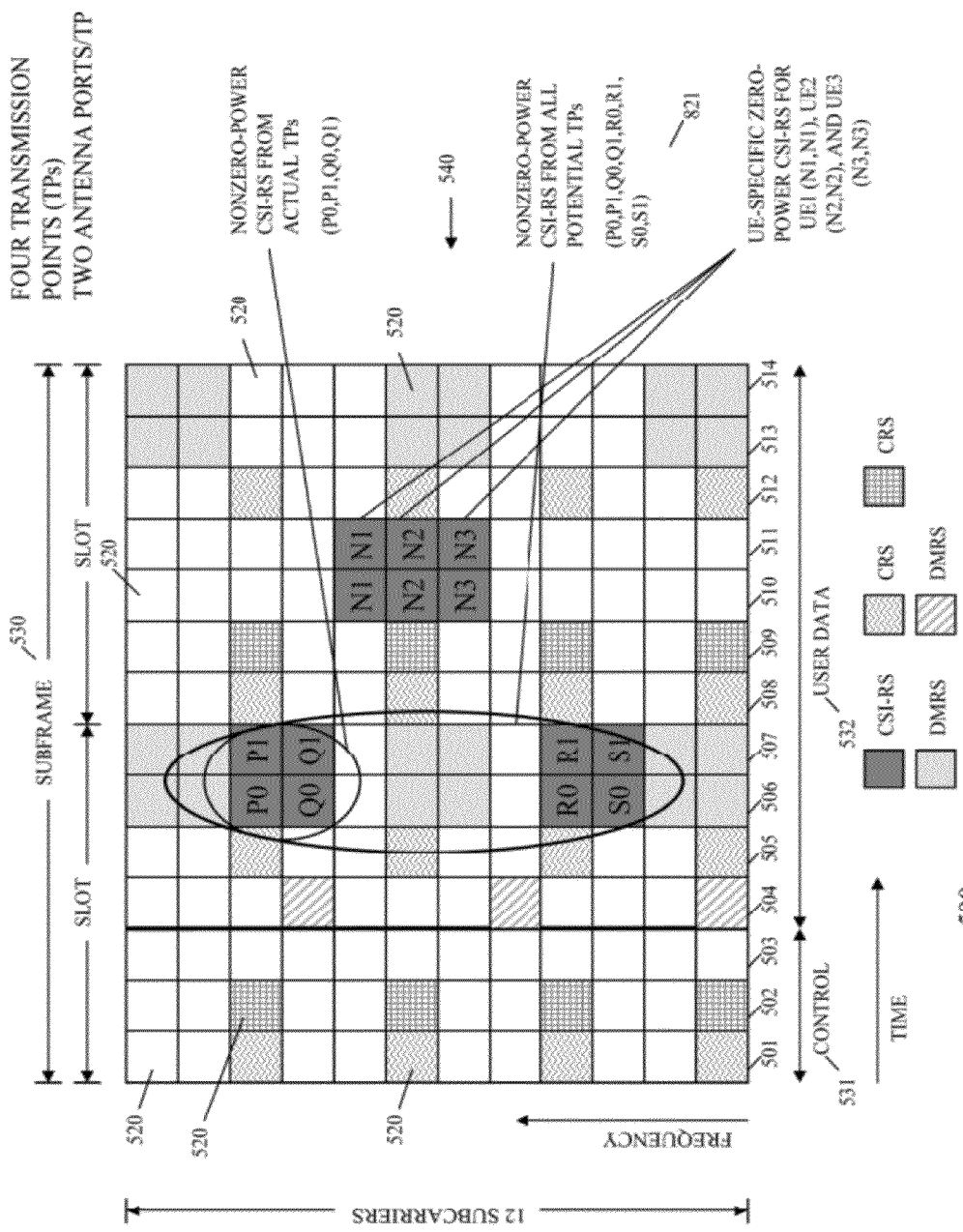
FIG. 9 is a block diagram illustrating an exemplary Channel State Information Reference Signal (CSI-RS) allocation scheme in accordance with another embodiment of the present invention.

In another embodiment of the present invention, illustrated in FIG. 9, a "transparent" operation (or UE-specific operation) is described. In a transparent operation, the potential set of transmission points is agnostic to the UE. The UE is aware of only a single set of transmission points for which the channel estimation is performed, that is, typically the actual set of transmission points. An eNB may use a set of four transmission points (for example, transmission points 1-4) for a coverage area, each with two transmit antennas. But, for a given UE, such as UE 101, the eNB may configure only a subset, for example, two transmission points (corresponding to antenna ports 1-4) as potential transmission points, which are also the actual transmission points for that UE. In additional two CSI-RS reference signals, represented in FIG. 9 by resource elements 'N1' (for UE 101), is set up with 'zero power' for UE 101. The transmission points 3 and 4 (corresponding to antenna ports 5-8) that do not perform actual transmission to UE 101, but could be simultaneously used to transmit to other UEs, such as UEs 102 and 103, and may thus constitute interference to UE 101. But in this transparent operation, it is the responsibility of the eNB to reflect this interference on the zero-power CSI-RS, and thereby improve accuracy of UE channel quality measurements, since UE has no knowledge of these interferers. Clearly, in this case, the definition of 'zero-power' is a UE-specific notion, as having zero-power from the UE-specific actual transmission points 1-4.

From an eNB perspective, the set of actual transmission points may depend on a UE and different sets may be needed to be configured for different UEs. This also implies that different 'zero-power' CSI-RSs may be needed for different UEs. For example, as illustrated in FIG. 9, these 'zero-power' CSI-RSs may be CSI-RSs corresponding to REs labeled 'N1,' 'N2,' and 'N3,' which CSI-RSs/REs 'N1,' 'N2,' 'N3,' correspond to different UEs, such as UE 101 UE 102, and UE 103. The advantage of this embodiment is that it allows a transparent operation at the UE. Further, in this case as well, a UE, that is, UE 101, measures the channel quality and can additionally select one or MIMO transmission parameters like precoding matrix index and a rank.

It can also be noted that an eNB may still need to assign as reference signals on resources corresponding to antenna ports 5-8 to enable measurements at other UEs, such as UEs 102 and 103. In such a case, UE 101 may need to know that there is no data on these corresponding REs. However, it is clear that UE 101 should not make interference measurements on these ports, but simply assume there is no transmission for UE 101. Such indication of REs reserved for other users may use the same "zero-power" declaration mechanism. Not to be confused by the true zero-power RS, such declaration is merely to reserve some REs on which UE101 should skip. UE 101 should, however, use the antenna ports corresponding to CSI-RSs 'N1' for its interference measurements. In this case, where multiple zero-power reference signals are configured (which could include reference signals N1, N2, and N3 and those corresponding to antenna ports of 5-8 which may not be known to the UE), one way a eNB can direct the UE to make interference measurements is to explicitly indicate, with a separate message, which zero-power ference signal is the right one to use for interference measurements. More generally, a eNB may also set up more than one zero-power reference signal for interference measurements and further instruct UE to average or sum the measured power on these signals to obtain interference.

In the above embodiments, the selection of transmission points for a UE may be determined autonomously by the eNB, or other means. Irrespective of which approach is taken to determine the actual transmission points, the embodiments described here to configure 'zero-power' may be used as long as the meaning is clear to the UE for measurement purposes. More generally, the advantage of 'zero-power' CSI-RS is that it allows for the capture of different combinations of potential interference including but not limited to i) residual interference outside coordination area common to all UEs served by a coordination area eNB ii) UE-specific interference based on selected transmission points. One can envision other applications where, further extensions of 'zero-power' and 'non-zero power' definitions may be used. As one example, a non-zero power antenna port may be defined corresponding to a group of antenna ports. Such definitions help UE to measure channel and interference that are suitable to enable CoMP.

Figure 10A:
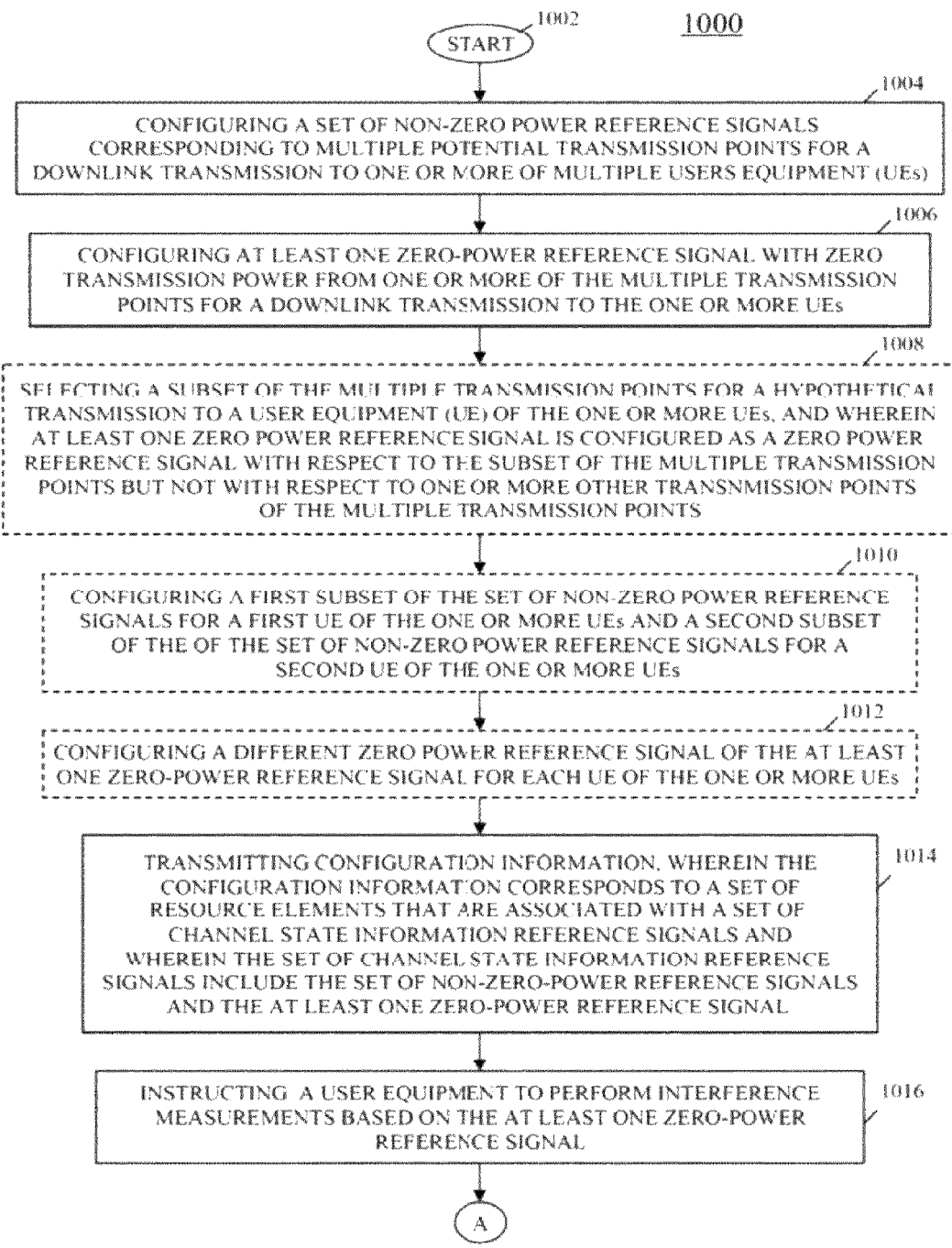
FIG. 10A is a logic flow diagram illustrating a method executed by an access network of the communication system of FIG. 1 in configuring a reference signal transmission in accordance with various embodiments of the present invention.
Figure 10B:
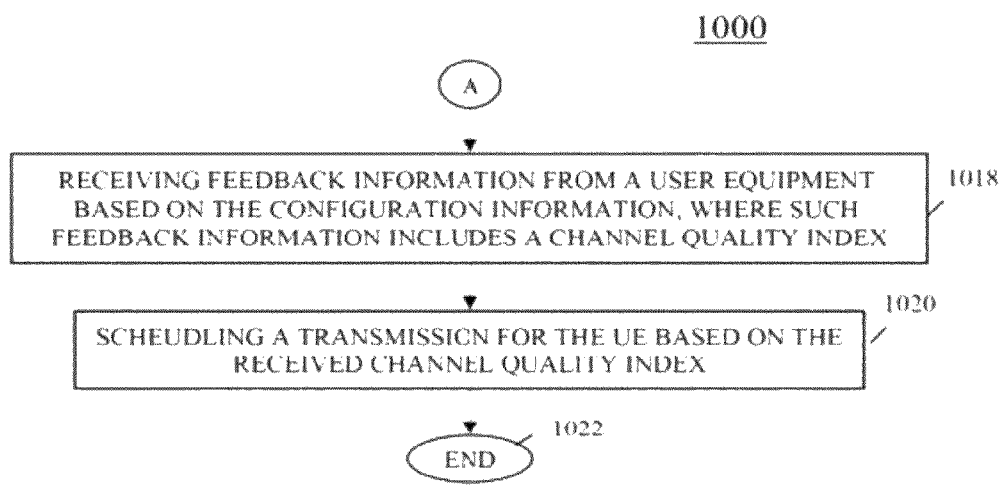
FIG. 10B is a continuation of the logic flow diagram of FIG. 10A illustrating a method executed by an access network of the communication system of FIG. 1 in configuring a reference signal transmission in accordance with various embodiments of the present invention.

Referring now to FIGS. 10A and 10B, a logic flow diagram 1000 is provided that illustrates a method executed by access network 140, for example, BS 110, in configuring a reference signal transmission, and in particular a CSI-RS transmission, in accordance with various embodiments of the present invention. Logic flow diagram 1000 begins (1002) when access network 140, and in particular BS 110, configures (1004) a set of non-zero power reference signals, preferably a CSI-RSs, in a downlink transmission and corresponding to multiple potential transmission points. BS 110 also configures (1006) at least one zero-power reference signal in the downlink transmission, again preferably a CSI-RSs, with zero transmission power from one or more, and preferably all, of the multiple potential transmission points. That is, the configuring of the at least one zero-power reference signal may include arranging from one, up to all, of the potential transmission points not transmitting any signal power on the at least one zero-power reference signal.

That is, BS 110 schedules multiple REs for non-zero-power reference signals, preferably CSI-RSs, corresponding to multiple potential transmission points, for multiple REs of a downlink transmission, such as a PRB 540. For example, referring now to FIG. 5, a non-zero-power CSI reference signal configuration for a UE may comprise groupings of two REs 521 or, as depicted in FIG. 8, may comprises a grouping of eight REs 821. Those of ordinary skill in the art can think of other CSI reference signal configurations for a downlink transmission, and any such configuration may be used herein. BS 110 further schedules at least one zero-power reference signal from one or more the multiple potential transmission points for to one or more corresponding REs of the downlink transmission. For example and referring now to FIGS. 8 and 9, a zero-power CSI reference signal configuration for a UE may comprise groupings of two REs such as REs (N,N) in FIG. 8 and REs (N1,N1,N2,N2,N3,N3) in FIG. 9.

An RE scheduled for a zero-power reference signal may be considered as being dedicated to an interference measurement by an UE. That is, such reference signal RE, to which a zero-power reference signal is allocated, is available to a UE to monitor for interference. While REs are used herein to refer to the physical resource over which the reference signals are transmitted, one of ordinary skill in the art realizes that any physical resource over which a reference signal can be wirelessly transmitted can be used herein without departing from the spirit and the scope of the present invention.

BS 110 then transmits (1014) configuration information to the UE that corresponds to a set of REs that are associated with a set of channel state information reference signals, which set of channel state information reference signals includes the set of non-zero-power reference signals and the at least one zero power reference signal. More particularly, the configuration information comprises control information that identifies the CSI reference signal configuration that maps to a set of REs. The configuration information can be conveyed in various types of control signaling, for example, the configuration information may be a bit field, such as an enumerated index, of a higher layer signaling message, that is, higher than Layer 1 (Physical Layer (RF) and baseband) and Layer 2 (control), for example, the payload of such a message, or the configuration information may be included in dynamic control signaling, such as allocation information at the beginning of a frame, for example, control region 531 of PRB 540. BS 110 further may convey (1016) an instruction to the UE (or, with respect to the embodiments described below, to each UE associated with a zero-power reference signal) to perform interference measurements based on the at least one zero-power reference signal.

In another embodiment of the present invention, access network 140, that is, BS 110, further may select (1008) a subset of the multiple potential transmission points for hypothetical transmission to, as opposed to transmission points that currently actually transmit to, the UE, that is, UE 101, which subset of the one or more of the multiple potential transmission points is associated with a subset of the set of non-zero power reference signals, and wherein at least one zero-power reference signal is configured as a zero-power reference signal with respect to the subset of the multiple potential transmission points but not with respect to one or more other transmission points of the multiple potential transmission points.

In yet other embodiments of the present invention, communication system 100, that is, BS 110, may configure (1010) a first subset of the set of non-zero power reference signals for a first UE, such as UE 101, of multiple UEs, that is, UEs 101-104, served by the BS and a second, different subset of the set of non-zero power reference signals for a second UE, such as UE 102, of the multiple UEs served by the BS, and/or BS 110 may configure (1012) a different zero-power reference signal for each UE of the multiple UEs served by the BS. In such other embodiments, the conveyed configuration information may be conveyed in higher layer, dedicated, UE-specific signaling that identifies the subset of the set of non-zero power reference signals and/or the zero-power reference signal configured for that UE, as appropriate.

In response to transmitting the configuration information (and any instruction to perform interference measurements based on the at least one zero-power reference signal) to one or more UEs, BS 110 receives (1018) feedback information reported by each such UE, which feedback information includes channel quality information such as a Channel Quality Index (CQI). That is, the at least one zero-power reference signal allows the UE to monitor for interference, to perform non-channel measurements, and to determine a channel quality metric based on interference received over a physical resource, that is, an RE, allocated for that at least one zero-power reference signal. That is, as the potential transmission points for the UE are not transmitting to the UE over this RE, the UE may measure a channel quality, such as a level of interference produced by signals transmitted by other transmission points, and determine, based on these measurements, a channel quality metric, such as a CQI or some kind of interference metric, such as a noise power, a Signal to Noise Ratio (SNR), a Carrier power to Interference plus Noise Ratio (CINR), or Signal to Interference plus Noise power Ratio (SINR), (which ratios may be determined based both on measurements associated with the set of non-zero-power reference signals and measurements associated with the at least one zero-power reference signal). The feedback information may further include a channel estimation that is based on the set of non-zero-power reference signals, for example, a precoding metric such as a PMI, a codebook index and a rank index, statistical feedback such as a covariance matrix or any other type of matrix, eignevectors, or channel quality mean and variance, a received signal quality information, a channel frequency response, or any other type of channel estimates known in the art, which the BS may use, for example, to predistort and beamform signals for transmission to the UE over the downlink of the intervening air interface.

BS 110 then schedules (1020) a transmission for each reporting UE based on the received feedback information. For example, the BS may use the reported channel estimation and channel quality metric to calculate non-spatial feedback information including modulation and coding rate (MCS), to set a transmit power, to select one or more sub-bands for data transmission, and to select weights for weighting information transmitted to the UE from multiple antennas of the BS. Logic flow diagram 1000 then ends (1022).

Figure 11:
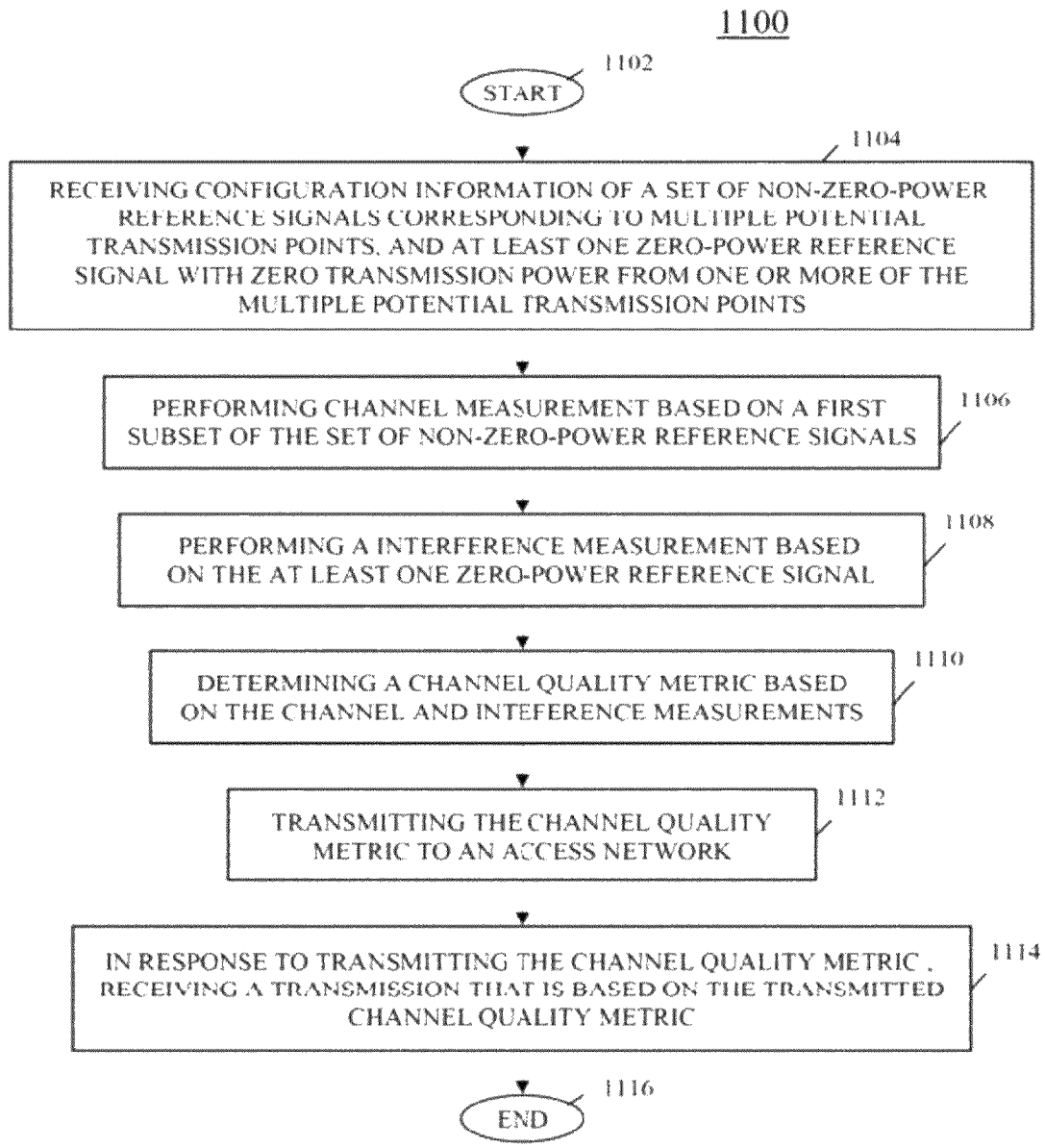
FIG. 11 is a logic flow diagram illustrating a method executed by a user equipment of the communication system of FIG. 1 in processing a received reference signal transmission in accordance with various embodiments of the present invention.

Referring now to FIG. 11, a logic flow diagram 1100 is provided that illustrates a method executed by a UE, for example, UE 101, of communication system 100, in processing a received reference symbol transmission, and in particular a CSI-RS transmission, in accordance with various embodiments of the present invention. Logic flow diagram 1100 begins (1102) when the UE, that is, UE 101, receives (1104), from an access network 140, and in particular from a BS, such as BS 110, and/or RRU serving the UE, configuration information informing of a set of non-zero power reference signals, preferably a CSI-RSs, corresponding to multiple potential transmission points and at least one zero-power reference signal, again preferably a CSI-RSs, with zero transmission power from one or more of the multiple potential transmission points. In an embodiment of the present invention, a subset of the set of non-zero power reference signals may be associated with, and received from, a set of actual transmission points from among the multiple potential transmission points. The configuration information may inform of a set of REs, which set of REs are associated with the set of non-zero reference signals, such as the set of REs 521 corresponding to non-zero CSI-RSs in FIG. 5 or the set of REs 821 corresponding to non-zero CSI-RSs in FIG. 8, and further are associated with the at least one zero-power reference signal, such as the set of REs (N,N) in FIG. 8 or the set of REs (N1,N1,N2,N2,N3,N3) in FIG. 9. In another embodiment of the present invention, wherein a subset of the set of non-zero power reference signals is associated with a set of actual transmission points, the configuration information may inform of that subset as well.

UE 101 then performs (1106) channel measurements based on the information concerning the set of non-zero power reference signals. When the received configuration informs of a subset, of the set of non-zero power reference signals, that is associated with a set of actual transmission points, the UE may perform channel measurements based on that subset of non-zero power reference signals, the UE may measure only that, first, subset and may additionally, or instead, perform channel measurements based on a second subset of the set of set of non-zero power reference signals, which second subset comprises reference signals in the set of non-zero power reference signals that do not belong to the first subset of the set of non-zero power reference signals and could be considered as interference.

That is, for each RE associated with the set of non-zero power reference signals, the UE measures, using techniques known in the art, a channel associated the RE based on the non-zero power reference signals conveyed by the corresponding multiple potential transmission points. The UE then performs a channel estimation, that is, estimates a channel response, based on the measurements using techniques known in the art.

UE 101 also performs (1108) interference measurements based on the at least one zero-power reference signal. That is, UE monitors REs associated with the at least one zero-power reference signal for interference and measures any detected interference. As the BS, and in particular the multiple potential transmission points, are not transmitting to the UE over such REs, UE may measure, in these REs, interference produced by signals transmitted by other sources. Possible interference sources may include signals from known BSs or cells, for example, transmissions from sources in a UE's CoMP transmission set, and signals from unknown BSs or cells, that is, from sources outside of the UE's CoMP transmission set.

In other embodiments of the present invention, the at least one zero-power reference signal comprises two or more zero-power reference signals and performing interference measurements comprises performing a first interference estimate on a first zero-power reference signal of the two or more zero-power reference signals, performing a second interference estimate based on a second zero-power reference signal of the two or more zero-power reference signals, computing a third interference estimate based on the first and second zero-power reference signals, and including the third interference estimate in the interference measurement. In one such embodiment, the third interference estimate may be based on one or more of a sum of the first and second interference estimates and an average of the first and second interference estimates. In another such embodiment, the third interference estimate is based on one or more of a best interference estimate of the first and second interference estimates and a worst interference estimate of the first and second interference estimates.

The UE then determines (1110) a channel quality metric based on these measurements, such as a CQI or some kind of interference metric, such as a noise power, a Signal to Noise Ratio (SNR), a Carrier power to Interference plus Noise Ratio (CINR), a Signal to Interference plus Noise power Ratio (SINR), or a recommended modulation and coding scheme (MCS). In determining the channel quality metric, the UE uses the channel measurements associated with the first set of REs, for example, the channel quality metric may be determined based the noise/interference measured in an RE of the second set of REs and a signal power of a CSI-RS received in an RE of the first set of REs.

UE 101 then transmits (1112) a channel quality metric to access network 140 and in particular BS 110,. In response to transmitting the channel quality metric, UE 101 receives (1114) a transmission for UE 101 based on the received channel quality metric and logic flow diagram 1100 then ends (1116).

By providing for a configuring of a set of non-zero power reference signals corresponding to multiple potential transmission points and a configuring at least one zero-power reference signal, with zero transmission power from one or more of the multiple potential transmission points, communication system 100 provides a UE with separate resources for performing a channel estimation and interference estimation, thereby providing for improved scheduling of the UE by a serving BS. More particularly, the BS transmits, to the UE, configuration information that corresponds to a set of REs that are associated with a set of channel state information reference signals, which set of channel state information reference signals includes the set of non-zero-power reference signals and the at least one zero power reference signal. The UE then performs channel measurements based on the information concerning the set of non-zero power reference signal and performs interference measurements based on the at least one zero-power reference signal, determines a channel quality metric based on these measurements, and transmits, to the BS, the channel quality metric, thereby enhancing the BS's ability to schedule the UE via one or more of the multiple potential transmission points.

In the above embodiments, certain terminology and examples has been used to describe the invention. However some generalizations can be easily applied. The transmission points used to transmit non-zero power reference signals may each have a different number of transmit antennas, and further a transmission point may not be referred to as such and more generally simply described as a grouping of antennas. Or the antenna ports corresponding to all antenna ports may simply be enumerated. Further the configurations of potential and actual transmission points may be flexible and time varying, with the corresponding change in configurations of non-zero power and zero-power CSI-RS for the UE as well, An eNB may also explicitly exchange information about which of the antenna ports are 'zeroed' on the zero-power CSI-RS with the UE, or implicitly instruct to measure certain interference measurements on some zero-power CSI-RS. Further, the zero-power and non-zero power CSI-RS may be preferably transmitted in the same subframes, but also may be transmitted in different subframes with different periodicities and offsets.

An eNB also may instruct a UE to apply additional power offsets or scaling to measured interference or channel on the zero-power or non-zero power reference signal (RS) before determining a channel quality metric. This may be desirable for undoing any normalization performed by the eNB on such reference signals or simply to capture effects of power control at another eNB.

In still other embodiments of the present invention, the measurements described herein can be used by the eNB to derive concurrent feedback of multiple CoMP transmission modes or interference scenarios. As an example, an eNB may configure multiple zero-power reference signals, each of which reflects a certain interference scenario implicitly. An interference scenario could be, for example, power control at one or more interferers, precoding matrix selections at interfering nodes, silencing of certain nodes or similar parameters that affects interference to a UE. The UE can further measure interference based on two or more of such zero power reference signals and may derive multiple corresponding channel quality indices. Further an eNB may instruct the UE to obtain interference based on an average or sum of interference observed on two or more zero-power RSs. It may also instruct the UE to feed back the index of the best or worst zero-power reference signals in terms of corresponding channel quality achieved and also the corresponding channel quality index. Additionally, in the non-transparent operation, where a UE explicitly measures channels of interfering nodes in the interfering (second) subset, an eNB also may use explicit signaling to convey interference scenarios, which could include, for example, power control/offsets at one or more interferers, precoding matrix selections at interfering nodes, silencing of certain nodes or similar parameters that affects interference to the UE.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for reference signal processing in a wireless communication user equipment, the method comprising:
    receiving a downlink transmission of configuration information, wherein the configuration information identifies a set of non-zero-power reference signals corresponding to a plurality of potential transmission points served by a same base station and at least one zero-power reference signal with zero transmission power, wherein a subset of the plurality of potential transmission points served by the same base station is selected and the at least one zero-power reference signal is configured as a zero-power reference signal with respect to the selected subset of the plurality of potential transmission points served by the same base station but not with respect to one or more other transmission points of the plurality of potential transmission points served by the same base station;
    performing a channel measurement based on one or more non-zero-power reference signals of the set of non-zero-power reference signals; and
    performing an interference measurement based on the at least one zero-power reference signal.

2. The method of claim 1, wherein the configuration information corresponds to a set of resource elements that are associated with a set of channel state information reference signals and wherein the set of channel state information reference signals comprises the set of non-zero-power reference signals and the at least one zero-power reference signal.

3. The method of claim 1, wherein one or more non-zero-power reference signals of the set of non-zero-power reference signals are sent from a set of actual transmission points chosen from the plurality of potential transmission points, wherein the set of actual transmission points consists of one or more transmission points of the plurality of potential transmission points.

4. The method of claim 3, wherein the at least one zero-power reference signal corresponds to no transmission from all of the set of actual transmission points.

5. The method of claim 3, further comprising receiving information of the one or more non-zero-power reference signals of the set of nonzero-power reference signals.

6. The method of claim 1, wherein the one or more non-zero-power reference signals of the set of non-zero-power reference signals is a first subset and wherein the method further comprises:
 measuring on a second subset of the set of non-zero-power reference signals, wherein the second subset of non-zero-power reference signals comprises reference signals in the set of non-zero-power reference signal that do not belong to the first subset of non-zero-power reference signals; and
 including the measurement on the second subset of non-zero-power reference signals in the interference measurement.

7. The method of claim 1, wherein the at least one zero-power reference signal corresponds to no transmission from all of the plurality of potential transmission points.

8. The method of claim 1, further comprising determining a channel quality metric based on the channel measurement and the interference measurement.

9. The method of claim 8, where the channel quality metric is a recommended modulation and coding (MCS) scheme.

10. The method of claim 1, wherein the at least one zero-power reference signal comprises two or more zero-power reference signals and wherein performing an interference measurement comprises:
 performing a first interference estimate on a first zero-power reference signal of the two or more zero-power reference signals;
 performing a second interference estimate based on a second zero-power reference signal of the two or more zero-power reference signals;
 computing a third interference estimate based on the first and second zero-power reference signals; and
 including the third interference estimate in the interference measurement.

11. The method of claim 10, wherein the third interference estimate is based on one or more of a sum of the first and second interference estimates and an average of the first and second interference estimates.

12. The method of claim 10, wherein the third interference estimate is based on one or more of a best interference estimate of the first and second interference estimates and a worst interference estimate of the first and second interference estimates.

13. A method for reference signal processing in a wireless communication system, the method comprising:
 transmitting configuration information to a user equipment of a set of non-zero power reference signals corresponding to a plurality of potential transmission points served by same base station;
 transmitting configuration information to the user equipment of at least one zero-power reference signal with zero transmission power;
 selecting a subset of the plurality of potential transmission points served by the same base station; and
 configuring the at least one zero-power reference signal as a zero-power reference signal with respect to the selected subset of the plurality of potential transmission points served by the same base station but not with respect to one or more other transmission points of the plurality of potential transmission points served by the same base station.

14. The method of claim 13, further comprising, the configuration information corresponds to a set of resource elements that are associated with a set of channel state information reference signals and wherein the set of channel state information reference signals comprises the set of nonzero-power reference signals and the at least one zero-power reference signal.

15. The method of claim 13, further comprising:
 receiving feedback information from the user equipment based on the transmitted configuration information, wherein such feedback information includes a channel quality index; and
 scheduling a subsequent transmission to the user equipment based on the channel quality index.

16. The method of claim 13, further comprising,
 instructing the user equipment to perform interference measurements based on the at least one zero-power reference signal.

17. The method of claim 13, further comprising:
 configuring a first subset of the set of non-zero power reference signals for a first wireless communication device of a plurality of wireless communication devices served by a base station and a second, different subset of the set of non-zero power reference signals for a second wireless communication device of the plurality of wireless communication devices served by the base station; and
 signaling the first subset and the second subset configurations using dedicated user equipment-specific signaling.

18. The method of claim 13, further comprising:
 configuring a different zero-power reference signal for each wireless communication device of a plurality of wireless communication devices served by the base station; and
 signaling the different zero-power reference signal configurations using dedicated user equipment specific signaling.

19. A user equipment capable of processing a reference signal in a wireless communication system, the user equipment comprising:
 a receiver that receives a downlink transmission of configuration information, wherein the configuration information identifies a set of nonzero-power reference signals corresponding to a plurality of potential transmission points served by same base station and at least one zero-power reference signal with zero transmission power, wherein a subset of the plurality of potential transmission points served by the same base station is selected and the at least one zero-power reference signal is configured as a zero-power reference signal with respect to the selected subset of the plurality of potential transmission points served by the same base station but not with respect to one or more other transmission points of the plurality of potential transmission points served by the same base station; and
 a processor that is adapted to perform a channel measurement based on one or more non-zero-power reference signals of the set of non-zero-power reference signals and perform an interference measurement based on the at least one zero-power reference signal.

20. A base station capable of reference signal processing in a wireless communication system, the base station comprising:
- a processor that is adapted to configure a set of non-zero power reference signals corresponding to a plurality of potential transmission points served by the base station and configure at least one zero-power reference signal with zero transmission power,
- wherein the processor is further adapted to select a subset of the plurality of potential transmission points served by the base station and configure the at least one zero-power reference signal as a zero-power reference signal with respect to the selected subset of the plurality of potential transmission points served by the base station but not with respect to one or more other transmission points of the plurality of potential transmission points served by the base station.

21. The base station of claim 20 further comprising a transmitter configured to transmit configuration information that corresponds to a set of resource elements that are associated with a set of channel state information reference signals, which set of channel state information reference signals includes the set of non-zero-power reference signals and the at least one zero power reference signal.

* * * * *